United States Patent
Hors et al.

(10) Patent No.: US 11,396,933 B2
(45) Date of Patent: Jul. 26, 2022

(54) LOCKING DEVICE FOR ELECTROMECHANICAL ACTUATOR AND ELECTROMECHANICAL ACTUATOR COMPRISING THIS DEVICE

(71) Applicant: ZODIAC ACTUATION SYSTEMS, Auxerre (FR)

(72) Inventors: Daniel Hors, Auxerre (FR); Joffrey Delong, Auxerre (FR)

(73) Assignee: ZODIAC ACTUATION SYSTEMS, Auxerre (FR)

( * ) Notice: Subject to any disclaimer, the term of this patent is extended or adjusted under 35 U.S.C. 154(b) by 47 days.

(21) Appl. No.: 16/626,777

(22) PCT Filed: Jun. 26, 2018

(86) PCT No.: PCT/EP2018/067099
§ 371 (c)(1),
(2) Date: Dec. 26, 2019

(87) PCT Pub. No.: WO2019/002285
PCT Pub. Date: Jan. 3, 2019

(65) Prior Publication Data
US 2020/0132176 A1 Apr. 30, 2020

(30) Foreign Application Priority Data

Jun. 29, 2017 (FR) ........................................ 1756035

(51) Int. Cl.
*B64C 25/26* (2006.01)
*F16H 25/20* (2006.01)

(52) U.S. Cl.
CPC ......... *F16H 25/2015* (2013.01); *B64C 25/26* (2013.01)

(58) Field of Classification Search
CPC ............. F16H 25/2015; F16H 25/2021; F16H 25/2025; F16H 2025/2073; B64C 25/26; B64C 25/28; B64C 25/30
See application file for complete search history.

(56) References Cited

U.S. PATENT DOCUMENTS 8,042,417 B2 * 10/2011 Davies .................... F02K 1/763
74/89.39
8,191,440 B2 * 6/2012 Hadley ............... F16H 25/2454
74/89.39

(Continued)

FOREIGN PATENT DOCUMENTS

EP 2149 496 A1 2/2010
FR 2 402 790 A1 4/1979

(Continued)

OTHER PUBLICATIONS

International Search Report dated Oct. 19, 2018, issued in corresponding Application No. PCT/EP2018/067099, filed Jun. 26, 2018, 4 pages.

*Primary Examiner* — Jake Cook
*Assistant Examiner* — Gregory Robert Weber
(74) *Attorney, Agent, or Firm* — Christensen O'Connor Johnson Kindness PLLC

(57) ABSTRACT

This locking device for an electromechanical actuator comprises a rod that is movable relative to a cylinder under the action of a motor actuating the rod, an assembly of at least one hook that can be moved between a locked position in which said hooks engage in an indentation and an unlocked position in which said set of hooks is released from the indentation, one of said set of hooks and the indentation being provided on the cylinder and the other on the rod. It comprises a sliding lock that can slide relative to said hooks and to the indentation between a holding position in which said hooks are held in the locked position a released position (Continued)

Figure 1:
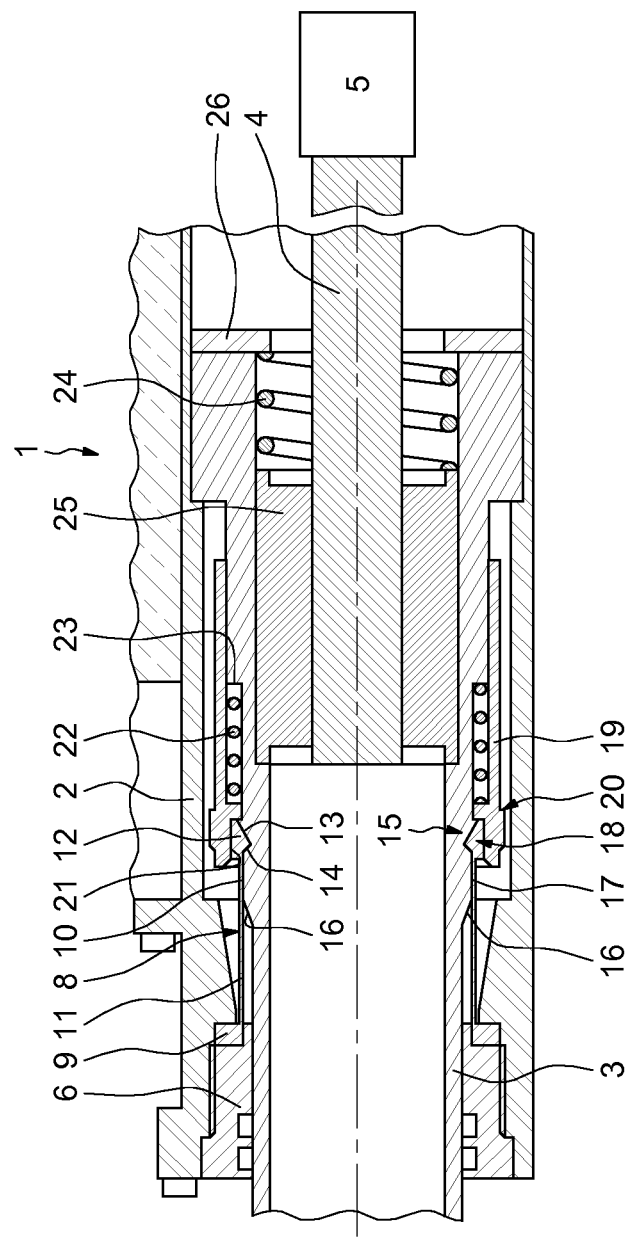

in which said hooks are released under the action of the motor actuating the rod.

10 Claims, 2 Drawing Sheets

(56) References Cited

U.S. PATENT DOCUMENTS

| | | | | |
|---|---|---|---|---|
| 10,520,106 | B2* | 12/2019 | Godbillon | F16K 31/0655 |
| 10,837,529 | B2* | 11/2020 | Macias Cubeiro | B64D 29/08 |
| 2015/0167702 | A1* | 6/2015 | Ozanich | B64C 25/16 |
| | | | | 92/27 |
| 2016/0025199 | A1* | 1/2016 | Boone | B64C 13/50 |
| | | | | 74/89.38 |

FOREIGN PATENT DOCUMENTS

| | | | |
|---|---|---|---|
| GB | 2501908 A | 11/2013 | |
| WO | 2008/102067 A1 | 8/2008 | |
| WO | WO-2015048970 A2 * | 4/2015 | B62D 33/067 |

* cited by examiner

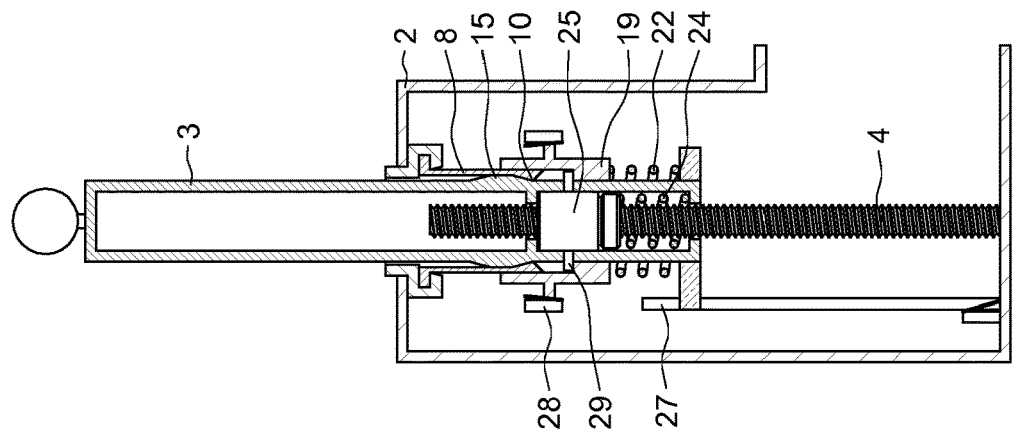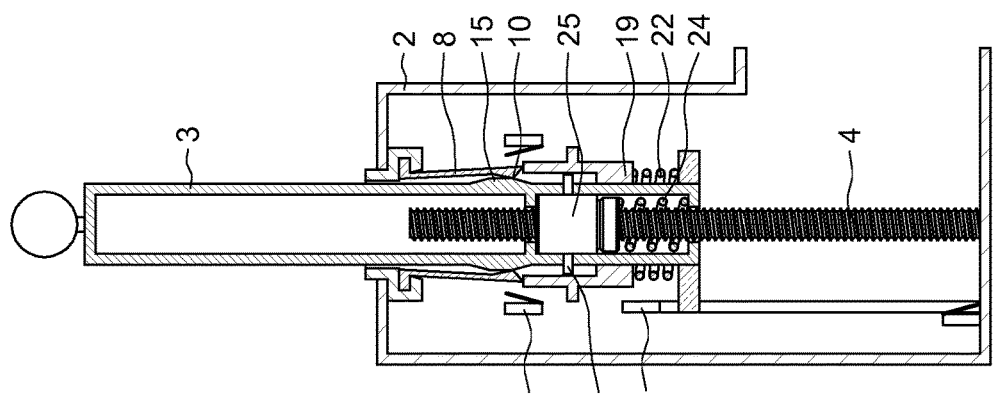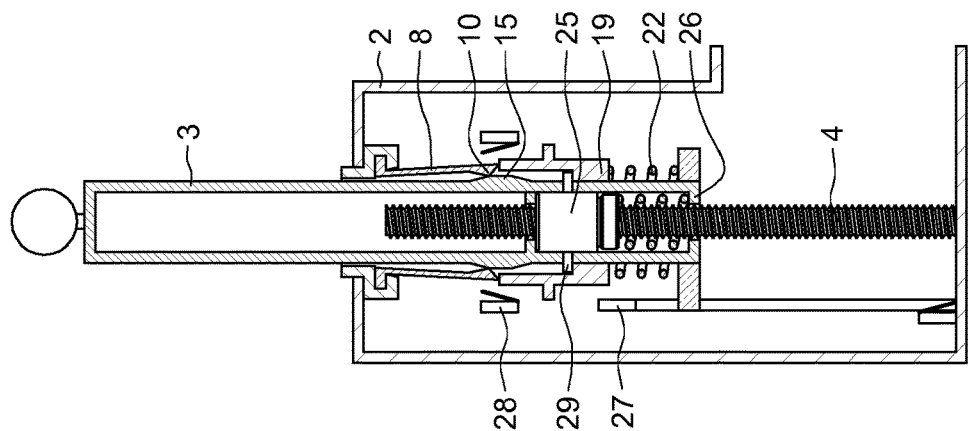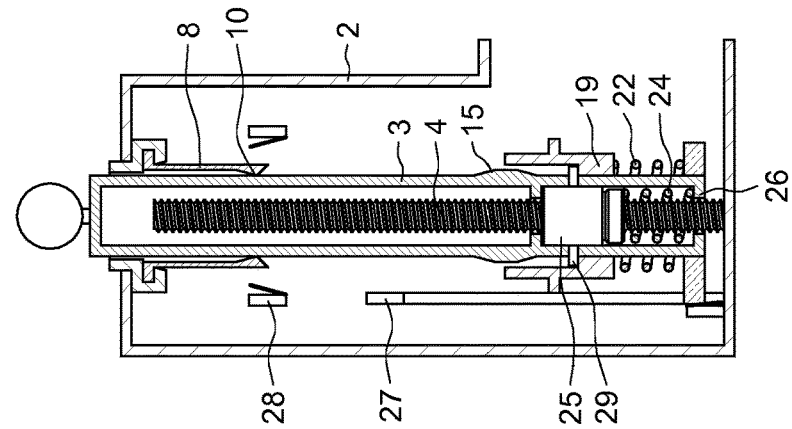

LOCKING DEVICE FOR ELECTROMECHANICAL ACTUATOR AND ELECTROMECHANICAL ACTUATOR COMPRISING THIS DEVICE

The present invention relates to electromechanical actuators and more particularly relates to an internal locking device of such an actuator. The invention relates in particular to an electromechanical actuator and also a corresponding locking device designed to be used in avionics.

In a particularly advantageous application, the invention relates to a landing-gear electromechanical actuator for an aircraft.

Locking rams with claws, that can be used for maneuvering and crossbracing members equipping aircraft landing gear, and locking thereof in a low position, are already known.

Retractable landing gear is generally activated hydraulically through the effect of a maneuver pressure.

Landing-gear architectures comprising one or more locks outside or inside the hydraulic actuator are known. These locks may be coupled to one or more indicators to indicate that the gear is in position and locked.

Locking devices with claws adapted to architectures comprising actuators engaging directly on hydraulic landing gear and withstanding all the forces applied to the gear have notably been developed.

However, the system for actuating and locking hydraulic gear presents certain drawbacks such as requiring supplementary equipment, such as pumps and high-pressure circuits.

Furthermore, the system for actuating and locking landing gear has to comply with regulations that impose locking by complementarity of form, or "positive" locking in the deployed position.

Requirements in the area of reliability and safety demand, moreover, the provision of reliable "gear deployed and locked" information.

The object of the invention is thus to propose a locking device for an electromechanical actuator and also an electromechanical actuator provided with such a locking device, which provides automatic locking of the actuator and is capable, furthermore, of automatic activation and deactivation and of providing reliable information on the locking position of the actuator.

A subject of the present invention is thus a locking device for an electromechanical actuator comprising a rod that can move relative to a cylinder through the action of a motor for actuating the rod. This device comprises an assembly of at least one hook that can move between a locked position, in which said hooks snap-fit into an indentation, and an unlocked position, in which said assembly of hooks is released from the indentation, said set of hooks and the indentation being provided one on the cylinder and the other on the rod.

It further comprises a lock that slides relative to said hooks and to the indentation between a position of holding said hooks in a locked position and a position of release of said hooks through the action of the motor for actuating the rod.

The lock thus allows automatic locking of the hooks in the indentation and resultant locking of the actuator when the rod of the actuator reaches its end-of-travel position.

For example, when the locking position of the actuator corresponds to the entirely deployed position of the rod, locking of the actuator is automatically obtained through the action of the motor for actuating the rod.

According to another feature, the device comprising a nut connected to the lock and capable of moving the sliding lock against a locking spring between a locked position, in which the sliding lock covers the hook at least in part, and a locked position releasing the hook.

For example, the lock is positioned relative to said hooks such that the lock is retracted against the force exerted by the spring through the action of said hooks.

In one embodiment, the hook comprises at least one slope capable of interacting with a ramp of corresponding form of the indentation.

The locking device may further comprise an unlocking spring designed to be arranged between the nut of the actuator and the rod of the actuator.

For example, the locking spring is prestressed in compression. Advantageously, the device further comprises at least one sensor for sensing the position of the sliding lock.

It may further comprise a motor for commanding the movement of the lock capable of generating the movement of the lock upon unlocking. Such a motor may be used, for example, to guarantee unlocking of the actuator when the locking position corresponds to a retracted position of the rod.

A further subject of the invention is an electromechanical actuator, comprising a rod that can move relative to a cylinder through the action of a motor for actuating the rod, and comprising an internal locking device as defined above.

In one embodiment, this actuator comprises an assembly of at least one hook provided on the cylinder and an indentation provided on the rod such that the locking device acts in the deployed position of the rod. It further comprises a lock mounted slidably about the rod of the actuator and a locking spring interposed between the lock and a stop connected to the cylinder, the lock being able to move from a locked position, in which the sliding lock covers the hook at least in part, to an unlocked position releasing the hook, through the action of said hooks, against the force exerted by the locking spring.

Further objects, advantages and features of the invention will become apparent from reading the following description, given solely by way of non-limiting example and with reference to the appended drawings, in which:

FIG. 1 shows a cross section of a locking device of an electromechanical actuator according to the invention, in the locked position; and FIGS. 2 to 5 illustrate different operating phases of an exemplary embodiment of an electromechanical actuator provided with a locking device according to the invention.

Reference will first be made to FIG. 1, which illustrates an exemplary embodiment of a locking device for an electromechanical actuator according to the invention, denoted by the general numerical reference 1.

In the exemplary embodiment envisaged, this actuator constitutes a landing-gear actuator for an aircraft, the deployed position of which constitutes an automatic locking position.

Naturally, there is no departure from the scope of the invention when such an actuator is designed to be used in other applications, for example as an actuator commanding a thrust reverser.

The actuator 1 comprises a cylinder 2 and a piston rod 3 that can move in the cylinder between an entirely deployed position, which corresponds to a deployed position of the gear, and a retracted position, which corresponds to a retracted position of the landing gear, through the action of a motorized screw 4 for example associated with a schematically illustrated motor 5 for actuating the actuator 1. In FIG. 1, the rod is shown in a deployed position.

As will be seen, the distal end of the cylinder is provided with a cover 6 that is provided with a central passage for the piston rod.

The actuator is furthermore provided with a locking device that acts on the piston rod to lock it at the end of travel. In the exemplary embodiment of FIG. 1, the locking device acts on the rod when the latter is in the entirely deployed position.

In this embodiment, the locking device is activated and deactivated through the action of the motorized screw 4 such that it is automatically activated when the screw generates the end-of-travel movement of deployment of the rod 3.

The locking device comprises a set of claws 8 each provided with a foot 9 or with a common foot fixed in translation between the cylinder 2 and the cover 6. The claws 8 are each provided at their free end with a resilient hook 10 comprising a resilient arm 11 and an end head 12 comprising an internal face, turned toward the rod 3, which is beveled, such as to delimited two ramp surfaces, namely a proximal ramp surface 13 and a distal ramp surface 14.

The piston rod 3 further comprises an indentation 15 made on the external peripheral surface of the rod.

In the embodiment illustrated in FIG. 1, this indentation forms a housing having a form complementing that of the head 12 of the claws. Thus, at the end of travel, the heads snap-fit into the indentation of the rod 3.

As will be seen, the external peripheral surface of the rod 3 thus comprises, for each claw, a first ramp 16, a flat 17 and a housing 18, which successively interact with the head of the claw when the rod is moved towards its entirely deployed position. Advantageously, the cylinder comprises a frustoconical internal zone located around the claws to allow angular deflection thereof upon elastic deformation of the claws 8.

The locking device further comprises a sliding lock 19 mounted slidably about the piston rod 3.

This lock 19 constitutes a slide that can move through the action of the screw 4, produced, for example, in the form of an annular component surrounding the rod 3. It comprises, here, a head 20 comprising an annular distal housing 21 that has a form complementing that of the planar external face of the heads 12 of the claws such that the free end of the claws is accommodated in the housing 21 in the locked position and is held in radial abutment in the housing 18 of the rod 3.

The locking device is supplemented with a locking spring 22 arranged between an annular shoulder 23 of the rod and the head 20 of the lock and a prestressed unlocking spring 24 interposed between a recirculating ball nut 25 screwed onto the motorized screw 4 and in abutment against the rod 3 and an end stop 26 integral with the proximal end of the rod 3.

The actuator 1 is locked when the rod is at the end of travel, as shown. In this position, the head of the claws is engaged in the housing 14 of the rod 3 and is held in this housing through the action of the lock 19. An external load tending to cause the rod 3 to retract into the cylinder 1 is taken up at the locking device comprising the hook 10 of the claws 8, the indentation 15 and the sliding lock 19. The operation of the actuator and of the latter's locking device just described will now be described with reference to FIGS. 2 to 5, in which elements identical to those of FIG. 1 bear the same reference signs.

In these figures, there is, again, the cylinder 2 and the piston rod 3 that can move in the cylinder through the actin of the motorized screw 4 and the locking device comprising the claws 8, the indentation 15 made on the external peripheral surface of the rod and the sliding lock 19 mounted slidably about the piston rod 3 and associated with the locking 22 and unlocking 24 springs.

Starting from the retracted position of the rod, visible in FIG. 2, rotation of the motorized screw 4 generates the axial movement of the recirculating ball nut 25 and the resultant movement of the rod.

As may be seen in FIGS. 3 and 4, upon movement of the rod the indentation 15 of the rod 3 comes into contact with the head 12 of the hooks 10 of the claws 8 and, by flexing, generate a radially external deformation of the claws 8.

When the heads 12 reach the flat 17, they are located opposite and axially bearing against the distal end of the lock 19 and generate the resultant movement of the lock rearward by compressing the locking spring 22, releasing the housing 18 of the rod.

With reference to FIG. 5, when the rod 3 abuts against an end-of-travel stop 27 on the cylinder, the claws 4, by virtue of their resilience, resume their initial position and engage in the housing 18 of the rod, releasing the sliding lock 19. The lock is then moved forward through the action of the locking spring 22 and covers the hooks 10 of the claws 8.

Lastly, the locked position of the sliding lock 19 is detected upon its passage facing one or more position sensors 28.

Reliable, safe "gear deployed and locked" information may then be emitted.

During the reverse operation, which consists in retracting the rod 3 into the cylinder 2 of the actuator, the motorized screw 4 acts first on the nut 25, which is, for this purpose, provided with a projecting finger 29 bearing against a proximal shoulder of the lock such as to move the sliding lock 9 against the unlocking spring 24.

At the start of travel, only the lock is moved such as to release the claw heads 12, the rod remaining immobile.

When the unlocking spring is entirely compressed, a resultant movement of the rod generates a release of the claws from the housing 18 and their movement along the flat 17 and the distal ramp 16.

In the exemplary embodiment just described, which corresponds to a locking of the electromechanical actuator in a deployed position of the rod, the locking device is automatically activated and deactivated solely through the action of the motorized screw.

It is also possible, in a variant, to make provision for locking of the actuator in a retracted position of the rod.

In this case, locking is effected through the action of the rod, while unlocking is effected through the action of a deactivation motor of the locking device, which acts on the slide of the lock to unlock it.

In the embodiment illustrated in the figures, the claws 8 provided at their free end with the resilient hook 10 are provided on the cylinder 2, while the indentation 15 is made in the piston rod 3.

The hooks 10 are, furthermore, turned toward the interior, in the direction of the indentation.

Locking is detected by detecting the position of the sliding lock 19.

Furthermore, unlocking of the sliding lock is effected by means of the nut that moves the lock against a locking spring to release the hooks.

It is thus an element inside the locking device that generates the unlocking of the lock.

The invention is not, however, limited to the embodiments described.

Indeed, in a variant, use is made of an external unlocking means acting on the movable lock 19.

Furthermore, it is likewise not a departure from the scope of the invention for the hooks to be borne by the piston rod and the corresponding indentation made in the cylinder, the hooks in this case being movable.

The invention claimed is:

1. A locking device for an electromechanical actuator having a rod that can move relative to a cylinder through action of a motor, said device comprising:
   an assembly of at least one hook that can move between a locked position, in which an assembly of at least one hook snap-fits into an indentation, and an unlocked position, in which said assembly of at least one hook is released from the indentation,
   said assembly of at least one hook and the indentation being provided one on the cylinder and the other on the rod; and
   a lock that slides relative to said assembly of at least one hook and to the indentation between a position of holding said assembly of at least one hook in the locked position and a position of release of said assembly of at least one hook in the unlocked position,
   wherein the motor is configured for actuating the rod, and
   wherein actuation of the rod causes the lock to move from the position of holding said assembly of at least one hook in the locked position to the position of release of said assembly of at least one hook in the unlocked position.

2. The device as claimed in claim 1, comprising a nut connected to the lock and capable of moving the lock against a locking spring between a locked position, in which the lock covers said assembly of at least one hook at least in part, and an unlocked position releasing the assembly of at least one hook.

3. The device as claimed in claim 2, wherein the lock is positioned relative to said assembly of at least one hook such that the lock is retracted against the force exerted by the locking spring through the action of said assembly of at least one hook.

4. The device as claimed in claim 2, wherein said assembly of at least one hook comprises at least one slope capable of interacting with a ramp of corresponding form of the indentation.

5. The device as claimed in claim 2, further comprising an unlocking spring designed to be arranged between the nut of the actuator and the rod of the actuator.

6. The device as claimed in claim 5, wherein the unlocking spring is prestressed in compression.

7. The device as claimed in claim 1, further comprising at least one sensor for sensing the position of the sliding lock.

8. An electromechanical actuator, comprising: a rod that can move relative to a cylinder through the action of a motor for actuating the rod, and the locking device as claimed in claim 1.

9. The electromechanical actuator as claimed in claim 8, comprising an assembly of at least one hook provided on the cylinder and an indentation provided on the rod such that the locking device acts in the deployed position of the rod, wherein the locking device comprises a lock mounted slidably about the rod of the actuator and a locking spring interposed between the lock and a stop connected to the cylinder, the lock being able to move from a locked position, in which the lock covers said assembly of at least one hook at least in part, to an unlocked position releasing said assembly of at least one hook, through the action of said assembly of at least one hook, against the force exerted by the locking spring.

10. The device as claimed in claim 8, wherein the locking device is automatically activated and deactivated solely through movement of rod by the motor.

\* \* \* \* \*